Jan. 10, 1967 R. P. MASSEY 3,297,960
INCREASED CURRENT CAPACITY TRANSISTOR CONVERTER
Filed Dec. 16, 1963
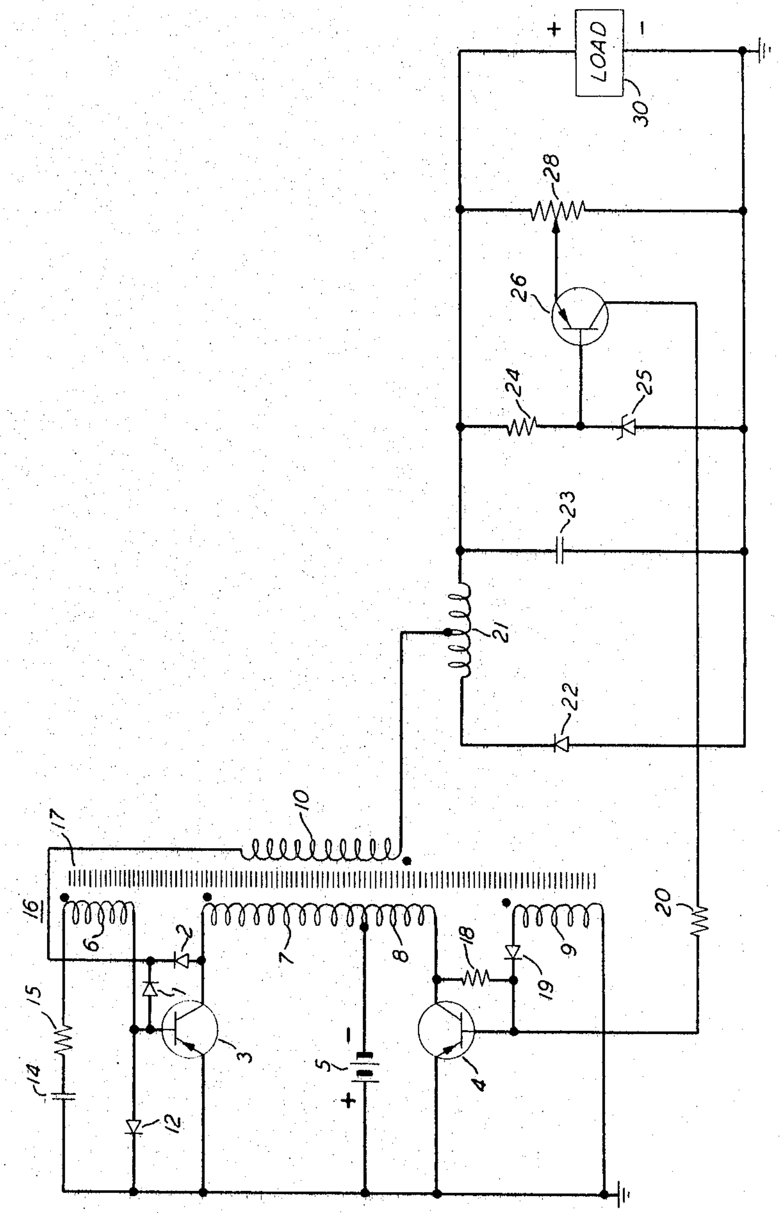
INVENTOR
R. P. MASSEY
BY R. B. Anderson
ATTORNEY United States Patent Office 3,297,960
Patented Jan. 10, 1967

3,297,960
INCREASED CURRENT CAPACITY TRANSISTOR CONVERTER
Richard P. Massey, Westfield, N.J., assignor to Bell Telephone Laboratories, Incorporated, New York, N.Y., a corporation of New York
Filed Dec. 16, 1963, Ser. No. 331,056
7 Claims. (Cl. 331—113)

This invention relates to voltage conversion circuits and more particularly to increased current capacity transistor converter circuits.

The output current capabilities of converter circuits in general, and notably transformerless current feedback converter circuits in particular, have been limited by the emitter-base current capacity of commercially available power transistors. Since the emitter-collector current capacity of these transistors is many times greater than the emitter-base current capacity, only this latter capacity restricts the delivery of larger current and hence power outputs. Where a converter with high current capacity has been required, converter circuits have either depended on voltage feedback alone or have introduced a current step-down transformer in the feedback path to limit the emitter-base current of the converter transistors.

The problem is particularly acute in, although not restricted to, asymmetric circuits where only one of the converter transistors supplies power to the load. The other converter transistor, which may have a lower power capacity, serves only to reset the saturable switching control transformer without supplying any power to the load. A half-wave rectifier is inserted between the transformer secondary winding and the load to isolate the load from the source during the period the reset transistor is conducting. The circuit is called an asymmetric circuit since the power transistor and the reset transistor conduct for unequal intervals of time, as opposed to a symmetric circuit wherein both transistors conduct for equal intervals of time. Since only one transistor delivers power to the load, asymmetric circuits were thought to be limited to low power outputs. In such applications, the major advantage of the asymmetric converter is the low unit cost inasmuch as only one relatively expensive high power capacity transistor is required instead of the usual two required by symmetric circuits.

To avoid the transistor emitter-base current limitation, a current step-down feedback transformer may be introduced in the current feedback path to effectively increase the current range of the converter by stepping down the high feedback currents to magnitudes below the maximum transistor base-emitter current limit. Although the power output of the circuit is thus increased, the addition of the transformer increases the converter unit cost to an undesirable level and, in the case of the asymmetric converter, the major advantage of economy is thereby nullified. For this reason, the usage of asymmetric converter circuits has been limited to only special, as opposed to general, applications.

It is therefore, an object of this invention to provide a low cost transistor converter circuit with a transformerless current feedback path wherein the emitter-base current capacity of the power transistors is increased to a value comparable with the transistor emitter-collector capacity. By so doing, the current range of converter circuits, and asymmetric converter circuits in particular, may be increased without destroying the major economy advantage of such converters.

Another object of this invention is to provide a converter with reduced transistor switching time.

In accordance with a feature of the present invention, a diode is connected in the current feedback path of a converter transistor to divide the feedback current between the emitter-base and emitter-collector paths of a converter transistor. The emitter-base current capacity of the converter transistor is thus effectively extended to a magnitude comparable to the emitter-collector capacity.

In accordance with yet another feature of the invention, the half-wave rectifier or isolation diode of an asymmetric converter is combined with the above-noted current extension diode to optimize the current extension capabilities of the current extension diode.

The nature of the invention and its distinguishing features and advantages will be more clearly understood from the detailed description and the accompanying drawing, the single figure of which is a schematic diagram of an embodiment of the invention.

As can be seen from the drawing, windings 6, 7–8, 9, and 10 which are wound on saturable core 17 of transformer 16 form an output circuit with the emitter-collector electrodes of transistors 3 and 4 being serially connected with winding portions 7 and 8, respectively, to the input direct-current source 5. Voltage feedback winding 6 is serially connected with diode 12 and the speed-up network comprising capacitor 14 and resistor 15. Diode 12, which is poled so as to be conductive during the nonconductive interval of transistor 3, both limits the inverse voltage appearing across the electrodes of transistor 3 and provides a discharge path for the energy stored in capacitor 14 and winding 6. Resistor 18 is connected between the base and collector electrodes of transistor 4 to provide quiescent class A bias for transistor 4. Diode 19 is serially connected with the voltage feedback winding 9 and the emitter-base path of transistor 4. Diodes 1 and 2 are connected both to the base and collector electrodes of transistor 3, respectively, and output winding 10, the other terminal of which is connected to the tap of filter inductor 21. Filter inductor 21 is serially connected between the load 30 and flyback diode 22. Filter capacitor 23 and potentiometer 28 are connected across the load 30 as is the series combination of resistor 24 and zener diode 25. The emitter of transistor 26 is connected to the wiper arm of potentiometer 28, and the base of transistor 26 is connected to the junction of resistor 24 and zener diode 25. Current limiting resistor 20 connects the base of transistor 4 to the collector of transistor 26.

The operation of the circuit is most easily understood by assuming that power transistor 3 is conducting and core reset transistor 4 is cut off. Transistor 3 may have a relatively high current or power capacity, whereas core reset transistor 4 need have only a relatively small current or power capacity. In the interval that transistor 3 is conducting, current flows from the positive terminal of the direct-current input source 5, through the emitter-collector path of transistor 3, into the dot of winding portion 7, and back to the negative terminal of the source 5. As can be seen from the relative polarities of the induced potentials indicated by the dots, the voltage induced in winding 6 drives transistor 3 further into conduction, which induces more voltage in winding 6 to regeneratively drive transistor 3 further into conduction and toward transistor saturation. This regenerative process continues until the volt-second energy necessary to saturate the core 17 (rectangular BH loop) of transformer 16 is supplied to the transformer via winding portion 7. Once the core 17 saturates, there is no longer any significant change of flux in transformer 16, the voltage induced in winding 6 falls to zero, the base drive of transistor 3 falls to zero, and transistor 3 cuts off. Once transistor 3 cuts off, the collapsing flux in transformer 16 induces potentials in windings 6, 7–8, 9, and 10 of a polarity opposite to the original polarity, driving transistor 3 further into cut-off, causing diode 19 to be biased out of conduction, and as discussed hereinafter, allowing conduction through transistor 4. The presence of diode 19 produces a marked difference from the usual converter circuit wherein the collapsing flux is used to bias the second transistor directly into conduction to begin the succeeding regenerative half cycle of operation. It should be noted that the inverse potential now induced in winding 10 is such as to back bias diodes 1 and 2 and thereby isolate power transistor 3 from the load during this interval.

Core reset transistor 4 is normally biased at quiescence by resistor 18 so as to operate in the class A mode over a full cycle. The potential induced in winding 9 in a sense supplements this bias in that it controls the state of conduction of transistor 4, i.e., class A or cut-off. As can be seen from the dots, the potential induced in winding 9 during the conduction interval of transistor 3 forward biases diode 19 and back biases transistor 4 into cut-off. As discussed heretofore, when transistor 3 cuts off, the collapsing flux in transformer 16 causes diode 19 to be back biased out of conduction thereby removing the back bias applied to the emitter-base electrodes of transistor 4 by winding 9, thus allowing quiescent bias emitter-collector current flow in transistor 4. The magnitude of the quiescent current flow is determined by the quiescent bias provided by resistor 18. Since diodes 1 and 2 are back biased by the potential induced in winding 10, the load 30 is effectively isolated from transistor 4 and this transistor thus need supply only sufficient energy to satisfy the volt-second saturation requirement of the saturable core 17. Once the core 17 saturates in the opposite direction, the flux will again collapse and induce potentials opposite to those induced when transistor 4 was conducting, and once again bias transistor 3 into conduction. This oscillatory operation then continuously repeats itself until the source 5 is removed from the circuit.

As noted heretofore, unlike the usual symmetric converter wherein both transistors conduct for equal intervals of time, the turns ratio of the asymmetric converter transformer may be adjusted to allow the power transistor to conduct for a longer interval of time than the core reset transistor. Even with this adjustment, however, the power output of the asymmetric converter has been restricted by the emitter-base current limitations of the power transistor. As discussed hereinafter, diodes 1 and 2 permit further extension of the asymmetric converter power capabilities. As can be seen from the symbolic representation of the turns ratio in the drawing, the power transistor 3 of the present circuit will conduct for a longer interval of time than will the core reset transistor 4. It should be clearly understood at this point, however, that although an asymmetric converter is used to illustrate the features of the present invention, the teachings are equally applicable to symmetric converters.

As noted in the description of the oscillatory operation of the circuit, the length of time it takes the core to saturate after transistor 4 is biased into conduction is determined by the volt-second energy supplied to the saturable core 17 via winding portion 8. The time that transistor 4 conducts is, therefore, inversely proportional to the voltage appearing across winding portion 8. It is thus possible to obtain closed loop voltage regulation by controlling the magnitude of the voltage appearing across winding portion 8 and using the inherent switching control, and in this case regulating, properties of the saturable core 17.

The closed loop regulating operation is best seen by referring to the drawing and assuming an undesirable increase in voltage across the load 30. Transistor 26 compares the portion of the load voltage variation which appears at the wiper arm of potentiometer 28 with the constant potential appearing across zener diode 25. Resistor 24 is provided to insure that zener diode 25 will be continuously conducting. Resistor 20 is a current limiting resistor. For an increase in load voltage, the voltage appearing across the emitter-base path of transistor 26 will increase, causing the potential across its emitter-collector path to decrease, which in turn decreases the emitter-base bias of transistor 4. Decreasing emitter-base bias of transistor 4 causes its emitter-collector-voltage drop to increase and, since the voltage of the source 5 is constant, the voltage appearing across winding portion 8 must decrease. As discussed previously, the saturation of the core 17 of transformer 16 depends on the volt-second energy supplied to the core and, since the voltage across winding portion 8 has decreased, the time the voltage appears must increase before the core once again saturates. The conduction interval of the core reset transistor 4, which is the interval that the current flow through transistor 3 is interrupted, is thus increased to compensate for the original assumption of an increase in load voltage. In the event of a decrease in load voltage, the voltage across the emitter-collector path of transistor 4 would decrease, thus increasing the voltage across winding portion 8, and decreasing the nonconductive interval of transistor 3 to increase the power supplied to the load. Thus, the combination of the saturable core 17, core reset transistor 4, and error detecting transistor 26, provide high efficiency closed loop voltage regulation. If error-detector transistor 26 were not provided, the converter would still operate, but without the closed loop regulation, with the conduction interval of transistor 4 being determined by the quiescent bias supplied by resistor 18. Since transistor 4 is never in saturation its switching speed capabilities are comparable to those of transistor 3, as discussed hereinafter.

In addition to providing the necessary isolation of the power transistor 3 from the load 30 during the conduction interval of core reset transistor 4, as previously discussed, diodes 1 and 2 also provide a clamping voltage to prevent saturation of the power transistor 3. By preventing saturation, the transistor is more easily and quickly switched thereby improving the over-all efficiency and performance of the circuit. Since this function of diodes 1 and 2 is more easily explained than the increased current capacity function of these diodes, it is discussed first and then followed by a discussion of the remaining feature.

The manner in which diodes 1 and 2 prevent saturation is most easily seen if it is assumed that transistor 3 is conducting and that diodes 1 and 2 have the same threshold voltage, as for example, where they are of the same semiconductor material. When transistor 3 conducts, current flows through both diodes 1 and 2, which are forward biased by winding 10 and, since the diodes are of the same semiconductor material and hence have approximately the same threshold voltage, the voltage drop across each diode is approximately equal with respect to each other. If the sum of the voltages around the loop comprising the base-collector path of transistor 3 is taken, it is readily seen that the voltage drop of the diodes cancel each other and the voltage drop across the base-collector electrodes must, therefore, in accordance with Kirchoff's law, be zero. Since the base-collector voltage drop of transistor 3 is thus constrained to zero, the transistor is clamped to an operating condition on the verge of saturation, but not in saturation (due to the small inherent forward threshold voltage unbalance in the diodes). Since the transistor never saturates, as will be explained later, it may be easily and quickly switched without losing the low impedance advantage (i.e., negligible collector-emitter voltage drop loss) of a transistor on the verge of saturation. This condition additionally facilitates the extension of the base-emitter current capacity of the power transistor, and hence the power capabilities of the circuit, as can be seen from the following discussion.

As a general proposition, the following equation is applicable to transistors operating in the linear or class A mode.

$$V_{ce}=V_{be}-V_{bc}$$

where the subscripts *b*, *c*, and *e* refer to the base, collector, and emitter electrodes, respectively, and V refers to the voltage between the electrodes indicated by the subscripts. In the embodiment of the invention illustrated in the drawing, we have noted that $V_{bc}$ of transistor 3, when it is conducting, is constrained to approximately zero by diodes 1 and 2 and, since $V_{be}$ is usually also negligible due to the low emitter-base impedance, then it follows from the noted equation that $V_{ce}$ must also be approximately zero. The emitter-collector path of transistor 3 therefore presents a negligible impedance to the flow of current appearing at the emitter of transistor 3. The current appearing at the emitter of transistor 3 will thus divide into two low impedance shunt paths, the first of which includes the emitter-base path of transistor 3 and diode 1 while the second includes the emitter-collector path of transistor 3 and diode 2. A large portion of the emitter-base current of transistor 3 is thereby shunted through the emitter-collector-diode 2 path to extend the current capacity of the transistor-diode combination to a magnitude many times greater than the base-emitter capacity of the transistor alone. The emitter-base current capacity power transistor limitation which restricted the power output of prior converters with comparable transistors is thus effectively overcome.

Although the foregoing discussion is directed to an illustrative embodiment of the invention wherein two diodes are employed, it appears that a single diode connected in the forward conductivity direction from the collector to the base of transistor 3 could be employed, notably in symmetric converters wherein the isolation introduced by diode 1 is not required. Although the voltage equilibrium noted heretofore would thus be modified in that the voltage drop across the diode would not be cancelled by an approximately equal and opposite voltage drop across another diode, the forward voltage drop of the diode is quite small and hence the circuit should continue to function in approximately the same manner.

Diodes 1 and 2 may thus also provide a current feedback path during the conductive interval of transistor 3 without the additional current step-down transformer heretofore thought to be necessary. The current feedback path may be traced from the dot end of winding 10, which supplies the load potential, through the right-hand portion of tapped inductor 21, through the load 30, through the emitter-base path of transistor 3 and, in the manner discussed heretofore, through diodes 1 and 2 back to the winding 10.

Voltage feedback is provided by the winding 6. Since voltage and current feedback are both provided, most of the advantages of each type of feedback are obtained and at the same time, most of the disadvantages of each are eliminated. It should be noted that if extension of the current capacity of transistor 3 were not required then diode 2 could be eliminated and diode 1 would be sufficient to provide a current feedback path.

Inductor 21, in addition to being a filter inductor, also provides an additional beneficial turn-off voltage to diodes 1 and 2 to insure sharp turn-off of these diodes. This is easily seen if it is assumed that transistor 3 is conducting such that load current is flowing out of the dot of output winding 10 and through the right-hand portion of inductor 21 to the load 30. In the manner discussed heretofore, at the point at which the core 17 saturates, there is no longer any change in flux in transformer 16 and hence no longer any voltage induced in the winding 10. Since there is no longer any voltage induced in the winding 10, the load current falls toward zero. As the load current is falling toward zero, the flux surrounding the inductor 21 collapses and inherently attempts to sustain the load current. The potential thus induced by the collapsing flux in inductor 21 both applies a sharp turn-off potential to diodes 1 and 2 which is independent of the potentials induced in winding 10 and forward biases flyback diodes 22 into conduction. The energy stored in inductor 21 is thereby transmitted to the load 30 via flyback diode 22 during the nonconductive interval of transistor 3 which, in combination with filter capacitor 23, maintains a constant voltage across the load.

It should be noted from the embodiment of the invention illustrated in the drawing that the positive terminal of the source 5 and the negative terminal of the load 30 are interconnected to ground. Diodes 1 and 2 prevent the source 5 from directly supplying the load 30, and thus makes possible polarity reversal between an input source, with one terminal grounded, and a load, with an opposite polarity terminal grounded, without the need for additional circuit components, such as for example, a transformer.

In summary, then, diodes 1 and 2, which may be of a similar semiconductor material, provide an effective extension of the emitter-base current capacity of the power transistor 3 to extend the power output of the converter. As noted, diode 1 may be eliminated in a slighty less efficient embodiment. Diodes 1 and 2 also establish a minimum clamping potential to insure that power transistor 3 is held on the verge of saturation rather than in saturation to obtain faster switching speeds.

The above-described arrangement is illustrative of the applicaation of the principles of the invention. Other embodiments may be devised by those skilled in the art without departing from the spirit and scope of the invention.

What is claimed is:

1. A converter which comprises a source of direct voltage, a transformer having a primary winding and at least one secondary winding, a load, a pair of transistors having their emitter-collector paths connected to conduct in alternation and pass current from said source through said primary winding in respectively opposite directions, at least one positive current feedback path which includes said secondary winding, said load, and the emitter-base path of one of said transistors, and at least one diode, poled in the direction of feedback current flow, connected between the collector electrode of said one transistor and said feedback path to divide the feedback current between the emitter-base and emitter-collector paths of said one transistor.

2. A converter circuit which comprises a source of direct voltage, a transformer having a primary winding and at least one secondary winding, a load, a pair of transistors having their emitter-collector paths connected to conduct an alternation and pass current from said source through said primary winding in respectively opposite directions, first and second diodes having similar threshold voltage values, at least one positive current feedback path which includes said secondary winding, said load, the emitter path of one of said transistors, and said first diode, said first diode being poled in the direction of feedback current flow, and means connecting said second diode also poled in the direction of feedback current flow between the collector electrode of said one transistor and said feedback path to divide the feedback current between the emitter-base and emitter-collector paths of said first transistor whereby both the optimum current extension and maximum switching speed of said one transistor may be obtained.

3. A converter circuit in accordance with claim 2 wherein said source of direct voltage has a polarity opposite to the polarity of the voltage appearing across said load with reference to a common polarity of said source and said load.

4. A converter circuit which comprises a source of direct voltage, a transformer having a primary winding and a secondary winding, a load, a pair of transistors having their emitter-collector paths connected to conduct in alternation and pass current from said source through said primary winding in respectively opposite directions, first and second diodes, a current feedback path which includes said secondary winding, said load, the emitter-base path of one of said transistors, and said first diode, said first diode being poled in the direction of feedback current flow, and means connecting said second diode, also poled in the direction of feedback current flow, between the collector electrode of said transistor and said first diode to divide the feedback current between the emitter-base and emitter-collector paths of said first transistor to achieve optimum current extension and maximum switching speed of said one transistor.

5. An asymmetric converter circuit which comprises a source of direct voltage, a transformer having a primary winding and at least one secondary winding, a power and a control transistor having their respective emitter-collector paths connected to conduct in alteration and pass current from said source through said primary winding in respectively opposite directions, said power transistor having an emitter-collector current capacity of at least several times the emitter-collector current capacity of said control transistor, first and second diodes having similar threshold voltage values, at least one positive current feedback path which includes said secondary winding, said load, the emitter-base path of said power transistor, and said first diode, said first diode being poled in the direction of feedback current flow, during the conduction interval of said power transistor and means connecting said second diode also poled in the direction of feedback current flow between the collector electrode of said power transistor and said first diode to divide the feedback current between the emitter-base and emitter-collector paths of said power transistor whereby both the optimum current extension and maximum switching speed of said power transistors may be obtained and said load is isolated for said power transistor during the conductive interval of said control transistor.

6. An asymmetric converter circuit comprising first and second transistors each having base, collector and emitter electrodes, a source of direct-current input potential, a saturable transformer having first, second, third and fourth windings wound thereon, means for serially connecting said source of input potential, the emitter-collector path of said first transistor, and at least a portion of said first winding, means for serially connecting said source of input potential, the emitter-collector path of said second transistor and the remaining portion of said first winding, means connecting said second winding to the base-emitter path of said first transistor, means connecting said third winding to the base-emitter path of said second transistor, first and second diodes, means connecting said first diode in the forward conductivity direction from the base electrode of said first transistor to said fourth winding, means connecting said second diode in the forward conductivity direction from the collector electrode of said first transistor to said fourth winding, a tapped filter inductor, a load, a flyback diode, means connecting said fourth winding to the tap of said tapped inductor and means for serially connecting said load, said flyback diode, and said inductor.

7. An asymmetric converter circuit in accordance with claim 6 wherein an error detector which compares a portion of the voltage appearing across said load to a reference voltage is connected to said load and to the base electrode of said second transistor whereby the impeddance of said second transistor is determined in accordance with load voltage variations.

No references cited.

JOHN F. COUCH, *Primary Examiner.*

W. H. BEHA, Jr., *Assistant Examiner.*